United States Patent [19]

Shibanai et al.

[11] Patent Number: 4,681,934

[45] Date of Patent: Jul. 21, 1987

[54] CROSSLINKING AGENT AND PROCESS FOR THE PREPARATION OF THE SAME

[76] Inventors: Ichiro Shibanai, 10-6-312, Akasaka 6-chome, Minato-ku, Tokyo 107; Koki Horikoshi, 39-8, Sakuradai 4-chome, Nerima-ku, Tokyo 176; Takashi Kato, 1170-14, Narahashi, Higashiyamato-shi, Tokyo 189, all of Japan

[21] Appl. No.: 772,299

[22] PCT Filed: Jan. 18, 1985

[86] PCT No.: PCT/JP85/00015

§ 371 Date: Aug. 22, 1985

§ 102(e) Date: Aug. 22, 1985

[87] PCT Pub. No.: WO85/03303

PCT Pub. Date: Aug. 1, 1985

[30] Foreign Application Priority Data

Jan. 20, 1984 [JP] Japan ................................. 59-7267

[51] Int. Cl.$^4$ ............................................. C08B 37/16
[52] U.S. Cl. ...................................... 536/46; 527/301; 156/336
[58] Field of Search ........................... 536/46; 527/301

[56] References Cited

U.S. PATENT DOCUMENTS

| | | | |
|---|---|---|---|
| 3,459,732 | 8/1969 | Hull et al. ............................. | 536/46 |
| 4,356,115 | 10/1982 | Shibanai et al. ................ | 252/522 A |
| 4,482,709 | 11/1984 | Iwao et al. ............................ | 536/46 |

FOREIGN PATENT DOCUMENTS

| | | | |
|---|---|---|---|
| 54-106595 | 8/1979 | Japan ..................................... | 536/46 |
| 58-150577 | 7/1983 | Japan . | |
| 59-227906 | 12/1984 | Japan .................................... | 536/46 |
| 60-226504 | 11/1985 | Japan .................................... | 536/46 |

OTHER PUBLICATIONS

Hawley, The Condensed Chemical Dictionary, Ninth Edition, Van Nostrand Reinhold Company, New York, N.Y., p. 464.

*Primary Examiner*—Ronald W. Griffin
*Attorney, Agent, or Firm*—Jordan and Hamburg

[57] ABSTRACT

A crosslinking agent constituted by a cyclodextrin clathrate compound of a compound having isocyanate group(s). This crosslinking agent is stable at room temperature and very readily initiates crosslinking. The crosslinking agent is prepared by reacting a compound having isocyanate group(s) with cyclodextrin at 65° C. or below in water, and recovering the clathrate compound from the water.

6 Claims, No Drawings

CROSSLINKING AGENT AND PROCESS FOR THE PREPARATION OF THE SAME

This invention relates to a plastic crosslinking agent which is chemically stable at room temperature and prepared by converting a compound having isocyanate group(s) into a cyclodextrin clathrate compound and a process for the preparation of the same.

BACKGROUND OF THE INVENTION

Compounds having isocyanate group(s) exhibit excellent properties as a crosslinking agent. However, these compounds have some disadvantages such that they are liable to react with water, bases, acids, ammonia, amines, alcohols, phenols, carboxylic acids and acid anhydrides at room temperature and that it is difficult to interrupt the above reactons once they start. In order to overcome these disadvantages, there have been proposed processes wherein an isocyanate compound is tentatively reacted with an appropriate compound such as an amine, acidic sulfite, tertiary alcohol, oxime, prussic acid, boric acid, phenol, mercaptan or enol lactam to thereby give a product in the form of an isocyanate regenerating material or an ioscyanate adduct, which is heated to regenerate or dissociate the original isocyanate compound when used as a crosslinking agent (cf. Japanese Patent Publication No. 30846/1980 and No. 41841/1983). However, these processes have some disadvantages in that the regeneration step as described above requires a high temperature of 160° to 180° C. and that the regeneration ratio of the isocyanate regenerating material falls upon storage.

SUMMARY OF THE INVENTION

We have found that heating a cyclodextrin clathrate compound of an isocyanate compound to approximately 100° C. results in the regeneration of the original isocyanate compound and that the above-mentioned clathrate compound can be stored at room temperature, thus completing the present invention.

Accordingly, it is an object of the present invention to make it possible to readily apply excellent plastic crosslinking effects of compounds having isocyanate group(s) to various plastic products by providing a plastic crosslinking agent comprising a cyclodextrin clathrate compound of a compound having isocyanate group(s) and a process for the preparation of the cyclodextrin clathrate compound of the compound having isocyanate group(s) which comprises reacting the compound having isocyanate group(s) with cyclodextrin at a temperature of 65° C. or below in water to give the cyclodextrin clathrate compound of the isocyanate compound and recovering the clathrate compound thus formed from the water.

DETAILED DESCRIPTION OF THE PREFERRED EMBODIMENTS

Examples of the compounds having isocyanate group, which will be referred to as IC hereinbelow, are as follows:

(1) 2,4-tolylenediisocyanate (2,6-tolylenediisocyanate) (TDI)

(2) 4,4'-diphenylmethanediisocyanate (MDI)

$$OCN-\text{\textlangle}\bigcirc\text{\textrangle}-CH_2-\text{\textlangle}\bigcirc\text{\textrangle}-NCO$$

(3) Hexamethylenediisocyanate (HMDI)
$OCN-(CH_2)_6-NCO$ (4) 1,5-naphthalenediisocyanate (NDI)

(5) tolidine-o-diisocyanate (6) m-xylenediisocyanate (MXDI)

(7) p-xylenediisocyanate (PXDI)

(7) polymethylene.polyphenylisocyanate (8) dimerryldiisocyanate (DDI)
$OCN[D]NCO \quad D = C_{36}$ (9) isophorone diisocyanate (IPDI)

(10) N,N'(4,4'-dimethyl-3,3'-diphenyl diisocyanate) uredione (TDI dimer)

(11) 4,4',4''-trimethyl-3,3',3''-triisocyanate-2,4,6-triphenyl cyanurate (TDI Trimer)

(12) triphenylmethane triisocyanate (TTI)

-continued

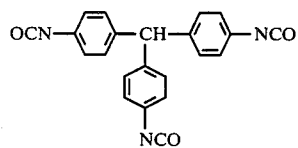

(13) hydrogenated MDI (HMDI)

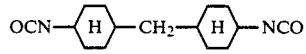

(14) hydrogenated TDI (HTDI)
2,4 hydrogenated TDI

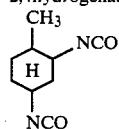

2,6 hydrogenated TDI

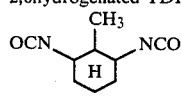

(15) dianisidine diisocyanate (DADI)

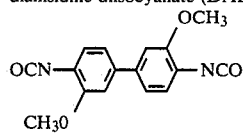

(16) Hexamethylene diisocyanate adduct

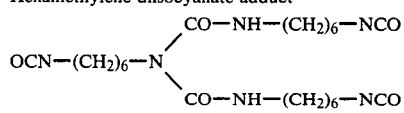

(17) trimethylolpropane-TDI adduct

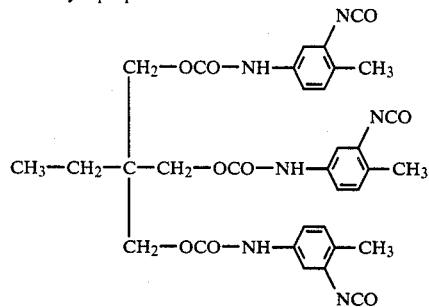

(18) crude MDI

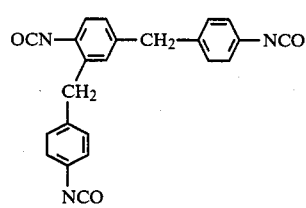

(19) 2,4,4-diphenyl ether triisocyanate (Hylen DM)

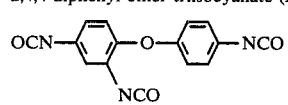

(20) diphenylmethane diisocyanate (MDI)

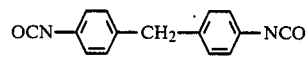

-continued

(21) trimethylolpropane-XDI adduct

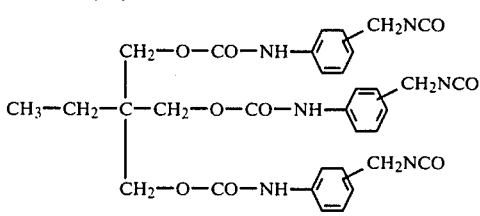

(22) trimethylolpropane-aliphatic isocyanate adduct

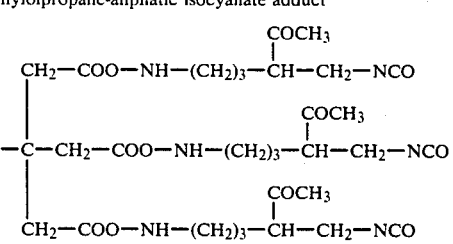

(23) phenol blocked trimethylolpropane-TDI adduct

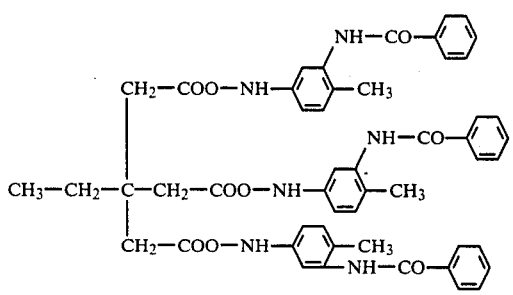

(24) blocked TDI dimer

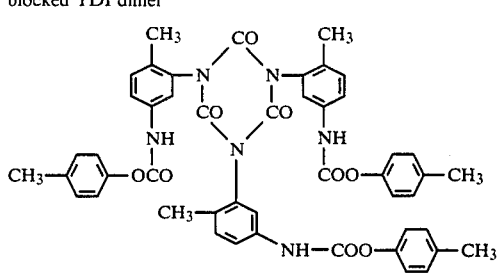

(25) tris(4-phenol isocyanate)thiophosphate

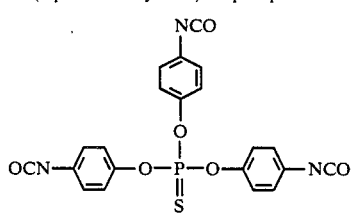

(26) Aromatic Sulfonic isocyanate
(27) Polymeric MDI

(28) polymeric TDI trimer

-continued

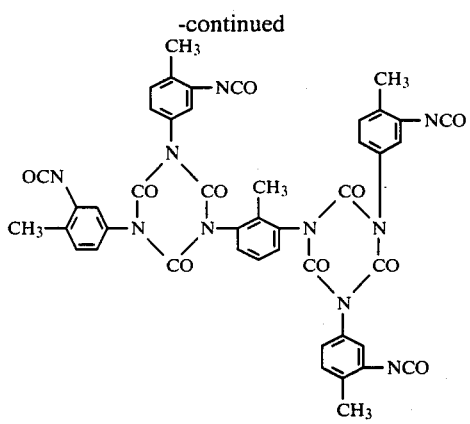

The cyclodextrin used in the present invention (hereinafter referred to as CD) may be in any of the α-, β- or γ-forms although the β- and γ-forms are preferable since they bring about a particularly high yield of the cyclodextrin clathrate compound considering the molecular size of the isocyanate compound.

A CD clathrate compound of an IC may be prepared by dissolving the CD in water (usually by heating to the boiling point of the water), adding dropwise the IC to the aqueous solution thus formed while vigorously stirring at a temperature of 60° C. or below, since a temperature higher than 60° C. would cause foaming which might lower the yield of the CD clathrate compound, allowing the reaction mixture to stand for two to 20 hours and collecting the CD clathrate compound thus precipitated. The obtained CD clathrate compound is dehydrated to give a compound containing 20 to 30% water which may be stored preferably in a dark and cool place. The mixing ratio of the IC to the CD in the above-mentioned process may be usually in the range of 2 to 4:1 depending on the molecular weight of the IC.

A CD clathrate compound of an IC is available in an extremely wide range as a plastic crosslinking agent as such or together with other appropriate additives. The original IC can be regenerated by removing the CD from the CD clathrate compound of the IC, i.e. releasing the isocyanate group, by heating the CD clathrate compound to approximately 100° C. Thus, it is not necessary to heat the CD clathrate compound to a higher temperature as required by conventional isocyanate regenerating materials. Alternately, the CD clathrate compound of the present invention may be decomposed to thereby liberate the IC by previously adding amylase, i.e., a starch decomposing enzyme to the clathrate compound and maintaining the clathrate compound at a temperature at which the amylase exerts a decomposing effect, e.g. 40° C., since the CD used in the present invention is formed by cyclization of glucose through an α-1,4 linkage.

The invention will be better understood through the following specific examples, which are illustrative and not limitative.

EXAMPLE 1

Base sheet for oily cosmetic product

A mixture of 100 parts of an 8% aqueous solution of polyvinyl alcohol (PVA), eight parts of ammonium stearate, 50 parts of a polyurethane emulsion (Aizelax #1040; a product of Hodogaya Chemical Co., Ltd.) and 15 parts of a CD clathrate compound of trimethylolpropane-TDI adduct (Crisvon NX; a product of Dainippon Ink and Chemicals, Inc.) was applied in a thickness of 1.2 mm on a polyester film of 40 in thickness while expanding 3.5-fold in an OAX mixer. After drying at 120° C. for 15 sec, the composite material was allowed to stand at room temperature for 24 hours. Then the polyester film was torn off to thereby give a foamed sheet which had a strong affinity for water and an excellent oil resistance. This sheet is available as a base material in preparing a cosmetic powder puff. The polyurethane emulsion comprising the CD clathrate compound of the IC had some advantages such that the IC could be added to the aqueous solution and that the resin solution had a long pot life and would be stable for 48 hours or longer.

EXAMPLE 2

Fabric processing

A polyester fabric was padded with an aqueous dispersion comprising five parts of PVA, 3% of diethylene glycol, 100 parts of water and 15 parts of a CD clathrate compound of HMDI adduct (Desmodur N; a product of Bayer A.G.) to give a draw ratio of 60%. The material thus obtained was dried and heated to 103° C. for ten min with steam to thereby allow crosslinking. Thus a washable polyester fabric having a moisture absorption ratio of 10% or above was obtained, which was achieved since the IC could be incorporated in the aqueous solution and the resin formed by the crosslinking was insoluble in water and had high moisture absorption properties.

EXAMPLE 3

Adhesive

An adhesive comprising 100 parts of a polyester resin solution in a solvent (Crisvon #4070; a product of Dainippon Ink and Chemicals, Inc.), 20 parts of the above-mentioned CD clathrate compound of Desmondur N and 25 parts of toluene was applied to two polyurethane foam substrates. These substrates were laminated to each other, heated to 105° C. for 10 sec and allowed to stand to complete the crosslinking. The composite material thus obtained exhibited a complete adhesion as well as an excellent oil resistance.

EXAMPLE 4

Fabric coating 15 parts of the above-mentioned CD clathrate compound of Crisvon NX was mixed with 100 parts of a polyester resin solution in a solvent (Crisvon N-184; a product of Dainippon Ink and Chemicals, Inc.) and 25 to 30 parts of ethyl acetate was added thereto to give a viscosity of 6000 cps. The mixture thus obtained was applied to a cotton fabric and dried at 60° to 70° C. The fabric thus coated was embossed with an embossing roller under wet conditions, molded by heating to 105° C. and subsequently allowed to stand at room temperature. Thus a washable embossed fabric was obtained by the crosslinking through the liberation of the Crisvon NX.

EXAMPLE 5

Paper binder

A gauze base paper comprising sulfite pulp was immersed in a mixture comprising 2% of polypropylene glycol, 8% of the above-mentioned CD clathrate compound of Desmodur N, 3% of polyacylate (Dicnal 2575; a product of Dainippon Ink and Chemicals, Inc.) and 0.5% of silicone (Toshiba Silicone 4380; a product of Toshiba Corporation), drawn to a draw ratio of 45%, dried on a drying drum at 150° C. for 80 sec, passed through a glazing calender, wound up while remoistening with a steam jet and allowed to stand for 24 hours to give a paper having a remarkably excellent water resistance.

EXAMPLE 6

Flock adhesive

A twill fabric of a density of ½ comprising 110 warps and 80 wefts each per 2.54 cm of Viscose rayon count 30 was previously immersed in a water-repellent solution comprising 3% of silicone (Scothguard FC 453; a product of Sumitomo 3M Co., Ltd.), drawn to 60%, dried, heated to 140° C. for five min and tentered. Subsequently an adhesive solution comprising 100 parts of polyacrylate (Dicnal #1571; a product of Dainippon Ink and Chemicals, Inc.), 10 parts of a CD clathrate compound of trimethylolpropene-TDI adduct (Colonate 75; a product of Nippon Polyurethane Co., Ltd.), 0.3 part of triethanolamine and 0.5 part of aqueous ammonia was applied on the above fabric in a ratio of 350 g/m$^2$. Then the fabric was static-flocked with nylon 1.5 d flocked piles of 0.8 mm in length and allowed to stand for five hours at room temperature to thereby crosslink the binder. Thus a flocked product for shoes having an excellent serviceability was obtained.

EXAMPLE 7

Nonwoven fabric binder

A fibrous material of polyester (Sontara 8003; a product of duPont de Nemour Ltd.) was immersed in a mixture comprising 100 parts of a polyurethane emulsion (Aizelax 4040; a product of Hodogaya Chemical Co., Ltd.), five parts of PVM (polyvinylmethylol), five parts of a silicone emulsion (Coagulant WS; a product of Bayer A.G.), 5 parts of the above CD clathrate compound of Crisvon NX and one part of triethanolamine at a ratio of 400 g/m$^2$, flocculated by heating to 80° C. and mangled. Then it was wound up while tentering at 160° C. to break the capsule walls and allowed to stand for five hours to thereby give a base sheet for the preparation of synthetic leather.

EXAMPLE 8

Nonwoven fabric binder

A nylon two having twelve 3 d, 51 mm crimps per 2.54 cm was cross-wrap carded to give a web weighing 70 g/m$^2$. After needle punching at a ratio of 150/cm$^2$, the web was immersed in a mixture comprising 50 parts of nitrilebutadiene rubber latices (Nipol LX-511; a product of Nippon Zeon Co., Ltd.), five parts of a mixture of sulfur/zinc oxide/dibenzothiazyl disulfide (1:1:1), 80 parts of the above-mentioned Dienal 1571, five parts of the above-mentioned Crisvon NX encapsulated in the form of the cyclodextrin clathrate compound and 0.5 part of triethanolamine and drawn to 80%. Then the material thus obtained was heated to 110° C. for five min under conditions wherein the capsule walls were broken and allowed to stand at room temperature for 10 hours to give a nonwoven fabric having an excellent oil resistance.

EXAMPLE 9

Adhesive coating material for synthetic leather

Sontara #8003 (a product of du Pont de Nemour Ltd.) was immersed in a mixture comprising 100 parts of Crisvon 7667 (a product of Dainippon Ink and Chemicals Co., Ltd.), 60 parts of DMF (dimethylformamide), three parts of benzyl phthalate, two parts of silicone (Bayer Silicone PL-50; a product of Bayer A.G.) and one part of oleyl alcohol, allowed to stand for 10 min, mangled, further immersed in water and mangled again. This procedure was repeated five times. Then a pigmented coating comprising 40 parts of Dilac WT white which was a solvent for titanium sulfide and polyester, 100 parts of polyurethane (Crisvon 6116SL; a product of Dainippon Ink and Chemicals Co., Ltd.) and 40 parts of toluene was applied to a mold-release paper, which had been previously embossed, at a ratio of 150 g/m$^2$. Then the obtained material was dried and an adhesive comprising 100 parts of polyester (Crisvon N-184; a product of Dainippon Ink and Chemicals Co., Ltd.), two parts of an organic amine (Crisvon accel NH; a product of Dainippon Ink and Chemicals Co., Ltd.), five parts of the above-mentioned CD clathrate compound of Colonate L and 30 parts of toluene was applied thereto at a ratio of 80 g/m$^2$. The above-mentioned Sontara 8003 immersion sheet was laminated onto the material and the composite material thus obtained was heated to 110° C. for five min to break the capsule walls and allowed to stand at room temperature. After separating the mold-release paper, a synthetic leather was obtained.

EXAMPLE 10

Rust-proof coating

A coating comprising a mixture of 100 parts of polyester (Desmophen 700; a product of Bayer A. G.), five parts of the above-mentioned Bayer Silicone PL-50, 120 parts of a CD clathrate compound of tris(4-phenyl isocyanate)thiophosphate (Desmodur RF; a product of Bayer A. G.), 80 parts of red iron oxide, 70 parts of red lead oxide and 60 parts of mineral spirits was a stable rust-proof coating which gave a coated surface of an excellent adhesion and hardness when applied on an iron plate, heated to 100° C. for two min and allowed to stand for eight hours.

EXAMPLE 11

Shoe adhesive

A stable shoe adhesive was prepared by dissolving 15 parts of nitrile-butadiene rubber latexes (Hycar 107; a product of Nippon Zeon Co., Ltd.) previously masticating in a roller mill at 60° C. for 30 min in 100 parts of a solvent mixture of methyl isobutyl ketone and methyl ethyl ketone (1:1) and adding 10 parts of the Desmodur R encapusulated in the form of a cyclodextrin clathrate compound thereto.

The adhesive was applied to sewn leather products (a shoe sole and a shoe upper) and dried. The shoe upper was laminated onto the shoe sole in a shoe mold and heated to 135° C. for one hour to give a shoe of an excellent adhesion.

The adhesive could be stored for a considerably longer period than with conventional adhesives containing isocyanate compounds.

EXAMPLE 12

Base material for cosmetic material 15 parts of the above-mentioned CD clathrate compound of polyurethane foam (Colonate L-75; a product of Nippon Polyurethane Co., Ltd.) was immersed in a mixture comprising 100 parts of the above-mentioned Aizelax 1040 (a product of Hodogaya Chemical Co., Ltd.) and 70 parts of water and drawn with a draw ratio of 60% to make the immersion mixture adhere to the skeleton of the foam. The obtained composite material was die-cut into a desirable form, heated to 105° C. for 10 min to break the capsule walls and allowed to stand for 20 hours. Thus a cosmetic powder puff which did not swell in paraffin oil was obtained.

EXAMPLE 13

Industrial protective coating

An Eghc steel plate was immersed in a coating solution comprising 100 parts of polyamine (Desmophen 1100; a product of Bayer A.G.), 12 parts of the above-mentioned CD clathrate compound of Colonate L-75 (a product of Nippon Polyurethane Co., Ltd.) and 20 parts of toluene, dried at 80° C., heated to 110° C. for two min and allowed to stand for 15 hours to give a coated surface of a sufficient hardness.

The coating solution exhibited no changes in viscosity upon storage for longer than a week. The coated surface further exhibited an excellent oil resistance and a swelling ratio less than 1% in mineral turpentine.

EXAMPLE 14

Improvement of Adhesive Tape

A coating solution comprising 100 parts of urethane (Crisvon 4090; a product of Dainippon Ink and Chemicals Co., Ltd.), 20 parts of the above-mentioned CD clathrate compound of Crisvon NX (a product of Dainippon Ink and Chemicals Co., Ltd.), three parts of Crisvon accel NH (a product of Dainippon Ink and Chemicals Co., Ltd.) and 30 parts of toluene was applied on a double-sided mold-releasing paper at a ratio of 300 g/m$^2$. The composite material thus obtained was dried at 80° C., cut into a split of 20 nm in width and wound up around a paper core to give a double-sided adhesive tape.

The double-sided adhesive tape thus obtained was laminated onto a substrate and heated to a temperature of 105° C. or above with a hot iron to thereby break the capsule walls and allow the isocyanate compound (i.e. Crisvon NX) to react. Thus an adhesion of a high waterproofness and oil resistance was achieved.

EXAMPLE 15

Enamel coating

An enamel coating comprising 100 parts of the above-mentioned Desmophen 1100, 260 parts of the above-mentioned CD clathrate compound of Colonate L-75 (a product of Nippon Polyurethane Co., Ltd.) and 20 parts of xylene was applied to a copper wire. The composite material thus obtained was heated to 110° C. for ten min to break the capsule walls of the Colonate L-75 and allowed to stand for five hours to give an enameled wire.

The above enamel coating solution can be stored for a prolonged period with smaller loss than with conventional polyurethane coatings.

EXAMPLE 16

Bonded fabric 100 parts of Crisbon 4090 (a product of Dainippon Ink and Chemicals Co., Ltd.) was mixed with 20 parts of the above-mentioned CD clathrate compound of Crisvon NX (a product of Dainippon Ink and Chemicals Co., Ltd.) dispersed in 40 parts of isopropyl alcohol and 0.5 parts of dibutyltin dilaurate was further added thereto to give a coating solution. This coating solution was previously immersed in a 3% solution of a fluoride water repellent (Scothguard; a product of Sumitomo 3M Co., Ltd.) and drawn with a draw ratio of 50%. 100 g of the coating solution thus obtained was applied to one surface of 210 d Nylon tafta while tentering by heating to 160° C. for 20 sec with a stenter. A raising boa of a knitted acryl fabric was laminated thereon and the composite material thus obtained was heated to 105° C. for 40 sec to evaporate the solvent and allowed to stand for 24 hours. Thus a waterproof arctic material for clothes was prepared.

As described above, the present invention makes the IC a stable and readily available plastic crosslinking agent useful in an extremely wide range. The crosslinking agent of the present invention is readily available not only in the above-mentioned Examples but in the following industrial purposes.

(1) Extrusion molding
  (A) sheet film
  (B) tire (solid tire)
  (C) belt
  (D) sealant
  (E) gear
  (F) screw
  (G) shoe sole heel top
  (H) wiper
  (I) electric wire
  (J) diaphragm
  (K) air brake
  (L) tube
  (M) insulation (2) Casting
  (A) printing roll
  (B) various rolls
  (C) belt
  (D) sealant
  (E) gasket
  (F) gear
  (G) screw
  (H) bumper (3) Fiber processing
  (A) coating
  (B) flock adhesive
  (C) bonded fabric adhesive
  (D) resin for resin processing
  (E) nonwoven fabric binder (4) Synthetic leather
  (A) improving immersion elastomer for base material of synthetic leather
  (B) coating
  (C) printing material for surface processing
  (D) surface film adhesive (5) Coating
  (A) rust-preventive coating
  (B) marine coating
  (C) automobile coating
  (D) industrial protective coating (E) wood working and furniture coating
(F) enamel
(G) floor coating (6) Adhesive
(A) for shoes
(B) for bonded fabric
(C) for woodworking and furniture
(D) for daily commodities
(E) for electrical parts
(F) for packaging
(G) for bookbinding
(H) for housing interior
(I) for marine interior
(J) for aircraft interior
(K) for cosmetic materials
(K) for stationery (7) Other applications
(A) improvement of polyurethane foam
(B) improvement of adhesive tape

What is claimed is:

1. A crosslinking agent comprising a cyclodextrin clathrate compound comprising cyclodextrin having included therein a compound having isocyanate groups.

2. A process for the preparation of a crosslinking agent comprising mixing a compound having isocyanate groups with cyclodextrin at a temperature of 65° C. or below in water to form a cyclodextrin clathrate compound having isocyanate groups and recovering the clathrate compound thus formed from the water.

3. A crosslinking agent according to claim 1, wherein said compound having isocyanate groups is selected from the group consisting of 2,4-tolylenediisocyanate, 2,6-tolylenediisocyanate, 4,4'-diphenylmethanediisocyanate, hexamethylenediisocyanate, polymethylene polyphenylisocyanate, dimerryldiisocyanate, isophorone diisocyanate, N,N'(4,4'-dimethyl-3,3'-diphenyl diisocyanate) uredione, 4,4',4''-trimethyl-3,3',3''-triisocyanate-2,4,6-triphenyl cyanurate, triphenylmethane triisocyanate, hydrogenated MDI, hydrogenated TDI, dianisidine diisocyanate, hexamethylene diisocyanate adduct, trimethylolpropane-TDI adduct, crude MDI, 2,4,4-diphenyl ether triisocyanate, diphenylmethane diisocyanate, trimethylolpropane-XDI adduct, trimethylolpropane-aliphatic isocyanate, phenol-blocked trimethylolpropane-TDI adduct, blocked TDI dimer, tris(4-phenyl isocyanate) thiophosphate, aromatic sulfonic isocyanate, polymeric MDI, and polymeric TDI trimer.

4. A process according to claim 2, wherein said compound having isocyanate groups is selected from the group consisting of 2,4-tolylenediisocyanate, 2,6-tolylenediisocyanate, 4,4'-diphenylmethanediisocyanate, hexamethylenediisocyanate, polymethylene polyphenylisocyanate, dimerryldiisocyanate, isophorone diisocyanate, N,N'(4,4'-dimethyl-3,3'-diphenyl diisocyanate) uredione, 4,4',4''-trimethyl-3,3',3''-triisocyanate-2,4,6-triphenyl cyanurate, triphenylmethane triisocyanate, hydrogenated MDI, hydrogenated TDI, dianisidine diisocyanate, hexamethylene diisocyanate adduct, trimethylolpropane-TDI adduct, crude MDI, 2,4,4-diphenyl ether triisocyanate, diphenylmethane diisocyanate, trimethylolpropane-XDI adduct, trimethylolpropane-aliphatic isocyanate adduct, phenol-blocked trimethylolpropane-TDI adduct, blocked TDI dimer, tris(4-phenyl isocyanate) thiophosphate, aromatic sulfonic isocyanate, polymeric MDI, and polymeric TDI trimer.

5. A process according to claim 2 further comprising heating the clathrate compound recovered from water at a maximum of approximately 100° C. to release the isocyanate groups from the clathrate compound.

6. A process according to claim 2 further comprising adding amylase to the clathrate compound to decompose the clathrate compound and release the isocyanate groups from the clathrate compound.

* * * * *